US011623653B2

(12) United States Patent
Liu et al.

(10) Patent No.: US 11,623,653 B2
(45) Date of Patent: Apr. 11, 2023

(54) AUGMENTED REALITY ASSISTED TRAFFIC INFRASTRUCTURE VISUALIZATION

(71) Applicant: Toyota Motor Engineering & Manufacturing North America, Inc., Plano, TX (US)

(72) Inventors: Yin-Chen Liu, Mountain View, CA (US); BaekGyu Kim, Mountain View, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 262 days.

(21) Appl. No.: 16/750,210

(22) Filed: Jan. 23, 2020

(65) Prior Publication Data
US 2021/0229691 A1    Jul. 29, 2021

(51) Int. Cl.
*B60W 50/14* (2020.01)
*G01C 21/36* (2006.01)
(Continued)

(52) U.S. Cl.
CPC ............ *B60W 50/14* (2013.01); *G01C 21/32* (2013.01); *G01C 21/365* (2013.01); *G06V 20/20* (2022.01);
(Continued)

(58) Field of Classification Search
CPC .................................................. B60W 50/14
See application file for complete search history.

(56) References Cited

U.S. PATENT DOCUMENTS 8,395,529 B2 * 3/2013 Seder ................ G08G 1/166
340/905
8,907,771 B2 * 12/2014 Vasquez ............... G08G 1/165
340/436
(Continued)

FOREIGN PATENT DOCUMENTS

CN          1748167 A      3/2006
IT      RM940543 A1      11/1994
(Continued)

OTHER PUBLICATIONS

Unpublished U.S. Appl. No. 16/264,475 (Toyota Ref. No. ITCUS-PT-0353), entitled "XR-Based Slot Reservation System For Connected Vehicles Traveling Through Intersections," filed Jan. 31, 2019.
(Continued)

*Primary Examiner* — Michael A Berns
(74) *Attorney, Agent, or Firm* — Dinsmore & Shohl LLP

(57) ABSTRACT

A method includes receiving a service request from a vehicle within a geographic area, receiving a first set of data from the vehicle comprising a position of the vehicle within the geographic area, a direction that the vehicle is facing, and a field of view for an augmented reality display associated with the vehicle, obtaining historical traffic data associated with the geographic area, identifying one or more traffic infrastructures within the field of view of the augmented reality display based on a map associated with the geographic area, the historical traffic data, the position of the vehicle, and the direction the vehicle is facing, generating an augmented reality image for the one or more traffic infrastructures based on the historical traffic data and the field of view of the augmented reality display, and sending the augmented reality image to the vehicle.

17 Claims, 11 Drawing Sheets

(51) Int. Cl.
*G01C 21/32* (2006.01)
*H04W 4/021* (2018.01)
*H04W 4/029* (2018.01)
*G06V 20/20* (2022.01)

(52) U.S. Cl.
CPC .......... *H04W 4/021* (2013.01); *H04W 4/029* (2018.02); *B60W 2050/146* (2013.01); *B60W 2556/50* (2020.02)

(56) References Cited

U.S. PATENT DOCUMENTS

| | | | |
|---|---|---|---|
| 8,994,520 B2* | 3/2015 | Stahlin | B60Q 9/008 |
| | | | 340/436 |
| 9,218,740 B2* | 12/2015 | Bahl | G08G 1/161 |
| 10,423,844 B2 | 9/2019 | Dai et al. | |
| 10,507,839 B2* | 12/2019 | Altmannshofer | G06V 20/584 |
| 10,607,416 B2* | 3/2020 | Nowakowski | G08G 1/22 |
| 10,635,905 B2* | 4/2020 | Newcombe | H04W 4/021 |
| 10,719,078 B2* | 7/2020 | Ferguson | B60P 1/36 |
| 10,748,426 B2* | 8/2020 | Cazzoli | G01S 17/931 |
| 10,850,744 B2* | 12/2020 | Alaniz | G06F 3/011 |
| 11,118,930 B2* | 9/2021 | Eyler | G02B 27/01 |
| 2003/0210228 A1 | 11/2003 | Ebersole | |
| 2014/0278053 A1 | 9/2014 | Wu et al. | |
| 2015/0175068 A1 | 6/2015 | Szostak et al. | |
| 2017/0241791 A1* | 8/2017 | Madigan | G06Q 40/08 |
| 2018/0031849 A1* | 2/2018 | Omanovic | G02B 27/0179 |
| 2019/0235241 A1 | 8/2019 | Suzuki et al. | |
| 2019/0354643 A1 | 11/2019 | Shum et al. | |
| 2021/0229691 A1* | 7/2021 | Liu | G01C 21/365 |

FOREIGN PATENT DOCUMENTS

| | | |
|---|---|---|
| JP | 2006172262 A | 6/2006 |
| JP | 2013041360 A | 2/2013 |
| WO | 2018217498 A1 | 11/2018 |

OTHER PUBLICATIONS

Yongxuan Lai, et al., "Distributed Public Vehicle System Based on Fog Nodes and Vehicular Sensing," Published Apr. 9, 2018, IEEE Access Journal, URL: https://ieeexplore.ieee.org/abstract/document/8333703.

Lotfi Abdi, et al., "Augmented Reality Based Traffic Sign Recognition For Improved Driving Safety," Published Apr. 13, 2016, ResearchGate Online Article, URL: https://www.researchgate.net/publication/299778634_Augmented_Reality_Based_Traffic_Sign_Recognition_for_Improved_Driving_Safety.

* cited by examiner

AUGMENTED REALITY ASSISTED TRAFFIC INFRASTRUCTURE VISUALIZATION

TECHNICAL FIELD

The present specification relates to augmented reality systems, and more particularly, to augmented reality assisted traffic infrastructure visualization.

BACKGROUND

When driving a vehicle, it is important for drivers to be able to see traffic infrastructures, such as lane markings, traffic lights, traffic signs, etc. Proper visibility of traffic infrastructures may be important to ensure that drivers are able to navigate to ensure the safety of drivers and avoid traffic accidents. However, in certain conditions, some traffic infrastructures may not be visible to drivers. This may be due to poor weather conditions that reduce visibility, damage to road surfaces, or degradation of traffic infrastructures over time such as faded signs or lane markings. Accordingly, a need exists for a system to allow drivers to see traffic infrastructures in conditions in which the traffic infrastructures would otherwise not be visible.

SUMMARY

In one embodiment, a method includes receiving a service request from a vehicle within a geographic area, receiving a first set of data from the vehicle, obtaining historical traffic data associated with the geographic area, identifying one or more traffic infrastructures within the field of view of the augmented reality display, generating an augmented reality image for the one or more traffic infrastructures, and sending the augmented reality image to the vehicle. The first set of data may include a position of the vehicle within the geographic area, a direction that the vehicle is facing, and a field of view for an augmented reality display associated with the vehicle. The one or more traffic infrastructures may be identified based on a map associated with the geographic area, the historical traffic data, the position of the vehicle, and the direction the vehicle is facing. The augmented reality image may be generated based on the historical traffic data and the field of view of the augmented reality display.

In another embodiment, an edge server is provided. The edge server includes one or more processors, one or more memory modules, and machine readable instructions stored in the one or more memory modules. When executed by the one or more processors, the machine readable instructions may cause the edge server to receive a service request from a vehicle within a geographic area serviced by the edge server, receive a first set of data from the vehicle, obtain historical traffic data associated with the geographic area, identify one or more traffic infrastructures within the field of view of the augmented reality display, generate an augmented reality image for the one or more traffic infrastructures, and send the augmented reality image to the vehicle. The first set of data received from the vehicle may include a position of the vehicle within the geographic area, a direction that the vehicle is facing, and a field of view for an augmented reality display associated with the vehicle. The one or more traffic infrastructures may be identified based on a map associated with the geographic area, the historical traffic data, the position of the vehicle, and the direction the vehicle is facing. The augmented reality image may be generated based on the historical traffic data and the field of view of the augmented reality display.

In another embodiment, a system includes an edge server, a map server, and a historical traffic data server. The edge server may receive a service request from a vehicle within a geographic area serviced by the edge server, determine whether a map of the geographic area stored on the edge server is up to date, in response to determining that the map of the geographic area stored on the edge server is not up to date, request an up to date map of the geographic area from the map server, receive a first set of data from the vehicle, receive historical traffic data associated with the geographic area from the historical data server, identify one or more traffic infrastructures within the field of view of the augmented reality display, generate an augmented reality image for the one or more traffic infrastructures, and send the augmented reality image to the vehicle. The first set of data received from the vehicle may include a position of the vehicle within the geographic area, a direction that the vehicle is facing, and a field of view for an augmented reality display associated with the vehicle. The one or more traffic infrastructures may be identified based on the map, the historical traffic data, the position of the vehicle, and the direction the vehicle is facing. The augmented reality image may be generated based on the historical traffic data and the field of view of the augmented reality display.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include edge servers and augmented reality systems that allow a driver of a vehicle to view traffic infrastructures that may otherwise not be visible. An augmented reality system of the present disclosure may comprise a heads up display in a vehicle or an augmented reality headset worn by a vehicle driver. The augmented reality system may connect to an edge server and request traffic infrastructure visualization assistance.

The edge server may obtain a map of the geographic area that the vehicle is in along with historical traffic data for that geographic area. The edge server may then identify traffic infrastructures within the field of view of the augmented reality system and create an augmented reality image to highlight the traffic infrastructures within the field of view. The edge server may transmit this image to the vehicle and the augmented reality system may display the image. This may allow the driver to see the traffic infrastructures through the augmented reality system regardless of the weather conditions, road conditions, or degradation of the traffic infrastructures.

Figure 1:
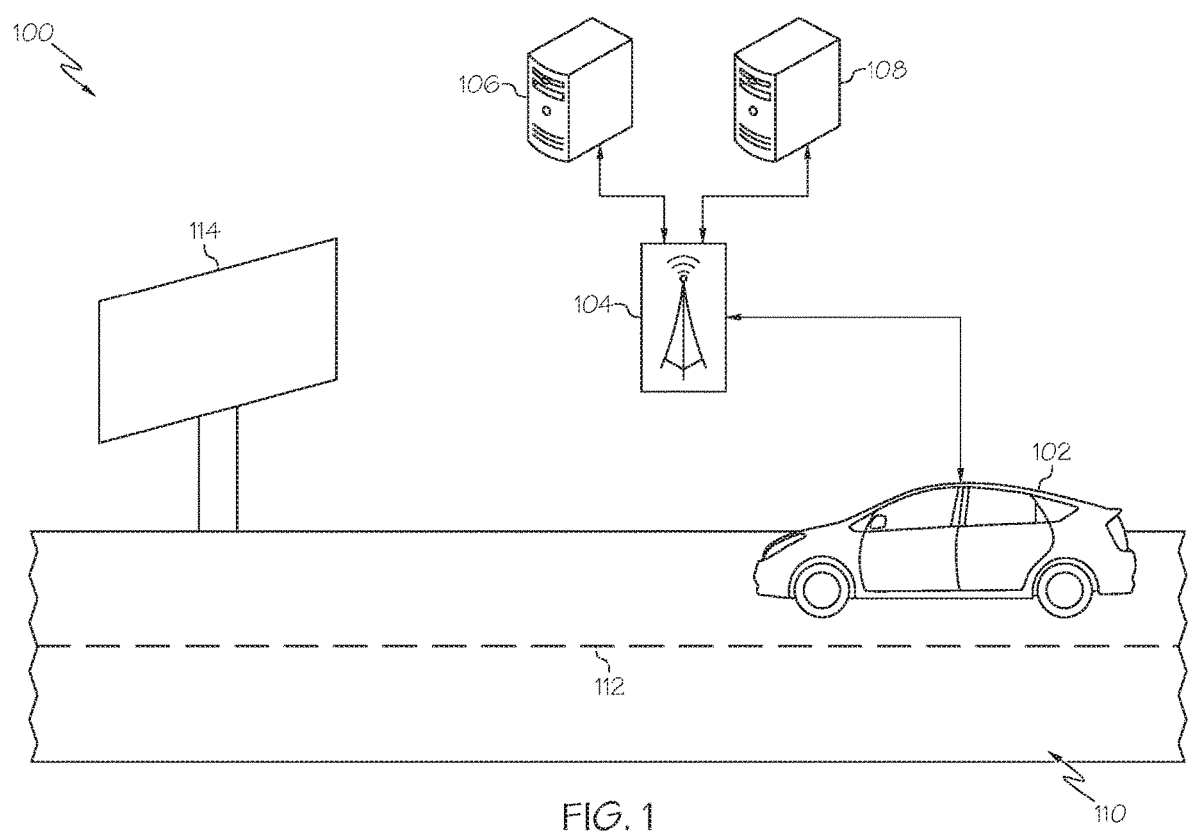
FIG. 1 schematically depicts a system for providing traffic infrastructure visualization assistance, according to one or more embodiments shown and described herein.

FIG. 1 schematically depicts a system 100 for augmented reality assisted traffic infrastructure visualization. The system 100 includes a vehicle 102, an edge server 104, a map server 106, and an historical traffic data server 108. In the example of FIG. 1, the vehicle 102 drives along a road 110 having a lane line 112. A sign 114 is positioned along the road 110. The vehicle 102 may be any type of vehicle. For example, the vehicle 102 may be a car, a truck, a sports utility vehicle, a bus, a semi-truck, a drone, or any other roadway-based conveyance.

The edge server 104 is communicatively coupled to the vehicle 102 and to the map server 106 and the historical traffic data server 108. Although a single edge server is shown in FIG. 1, the system 100 may comprise a plurality of edge servers along the road 110 or elsewhere positioned, with each edge server providing coverage for a particular geographic area, as explained in further detail below.

In the illustrated example, the edge server 104 is a fixed edge server, e.g., a road-side unit (RSU). In some embodiments, the edge server 104 may be a moving edge server, e.g., another vehicle on the road 110. In the illustrated example, the edge server 104 is positioned near the road 110 such that it may be communicatively coupled to the vehicle 102. In examples in which there are multiple edge servers, each of the edge servers may be spaced apart from each other such that each edge server covers a different service area. That is, as the vehicle 102 drives along the road 110, it may always be within range of at least one edge server such that the vehicle 102 may be connected to that edge server. Thus, as the vehicle 102 drives along the road 110, the vehicle 102 may move between coverage areas of different edge servers. If the vehicle 102 is within range of multiple edge servers, the vehicle 102 may connect to the edge server that is underutilized or may use another metric to determine which edge server to connect to. In other examples in which the vehicle 102 is within range of multiple edge servers, another method may be used to determine which edge server to connect to.

In the illustrated embodiment of FIG. 1, when the vehicle 102 is within range of the edge server 104, the vehicle 102 may transmit to the edge server 104, a request for augmented reality assisted traffic infrastructure visualization. In some examples, a driver of the vehicle 102 may cause the vehicle 102 to request augmented reality assisted traffic infrastructure visualization by pressing a button, flipping a switch, speaking a command, or otherwise turning on an augmented reality assisted traffic infrastructure visualization system. The driver may request augmented reality assisted traffic infrastructure visualization when the weather conditions have reduced visibility, when certain traffic infrastructures have been degraded or damaged, or anytime the driver would like augmented reality visualization assistance while driving. In other examples, the vehicle 102 may automatically transmit a request for augmented reality assisted traffic infrastructure visualization when the vehicle 102 detects particular driving conditions, such as outside weather that causes reduced visibility. When the vehicle 102 transmits a request for augmented reality assisted traffic infrastructure visualization to the edge server 104, the operation of the system 100 is triggered, as described further below in connection with FIG. 3. In some examples, the edge server 104 may be replaced by a cloud server or remote computing device. In other examples, the components of the edge server may be contained within the vehicle 102.

Figure 2:
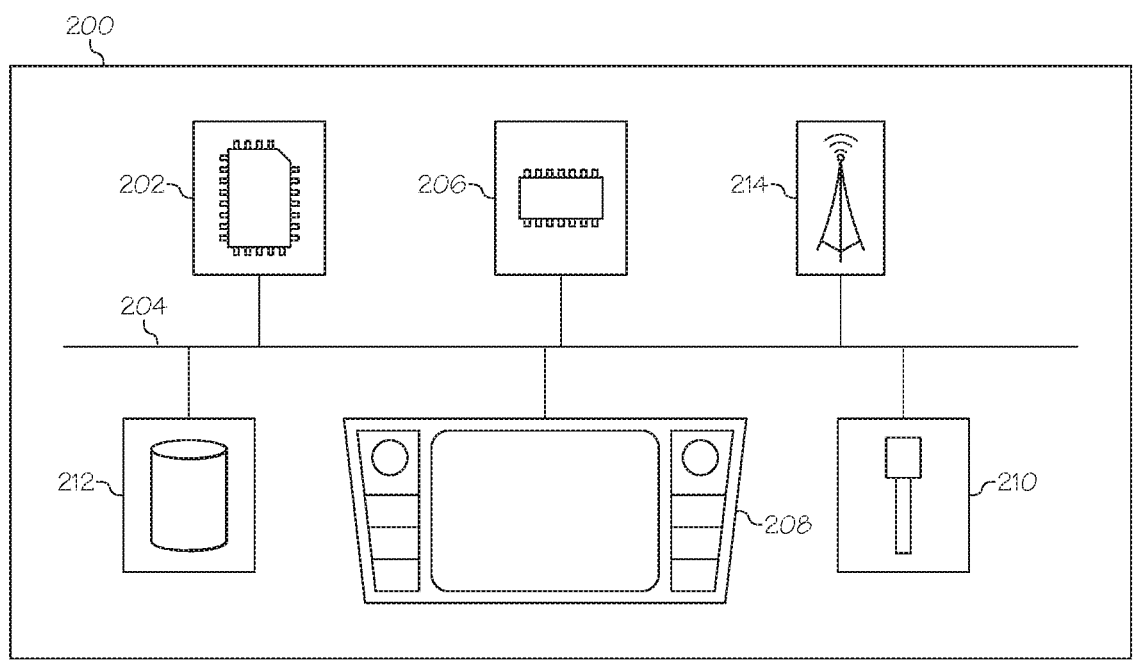
FIG. 2 depicts a schematic diagram of a vehicle system, according to one or more embodiments shown and described herein.

FIG. 2 depicts a vehicle system 200 included in the vehicle 102 of FIG. 1. The vehicle system 200 includes one or more processors 202, a communication path 204, one or more memory modules 206, an augmented reality display 208, a satellite antenna 210, one or more vehicle sensors 212, and network interface hardware 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the con path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises an augmented reality display 208 for displaying augmented reality images. In the example of FIG. 2, the augmented reality display 208 comprises a heads-up display to display augmented reality images. The augmented reality images shown on the augmented reality display 208 may comprise a graphical overlay to a view through the windshield of the vehicle 102 as shown in FIGS. 8B, 9B, 10B, and 11B. This graphical overlay may allow traffic infrastructures that are degraded or not visible with the naked eye to be seen by the driver through the augmented reality display 208. For example, FIG. 9A shows a portion of a road as viewed by a driver where various traffic infrastructures including lane lines, traffic lights, and road signs are not clearly visible due to adverse weather conditions. FIG. 9B shows that same portion of road viewed through the augmented reality display 208 with an augmented reality image highlighting the traffic infrastructures such that they may be easily seen by the driver. In some examples, the augmented reality display 208 may comprise an augmented reality headset worn by the driver rather than a heads up display.

Referring back to FIG. 2, the vehicle system 200 comprises a satellite antenna 210 coupled to the communication path 204 such that the communication path 204 communicatively couples the satellite antenna 210 to other modules of the vehicle system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210, by the one or more processors 202. Thus, the satellite antenna 210 allows the vehicle 102 to monitor its location. The vehicle 102 may transmit its location to the edge server 104 to obtain traffic infrastructure visualization assistance, as explained in further detail below.

The vehicle system 200 comprises one or more vehicle sensors 212. Each of the one or more vehicle sensors 212 is coupled to the communication path 204 and communicatively coupled to the one or more processors 202. The one or more vehicle sensors 212 may include, but are not limited to, LiDAR sensors, RADAR sensors, optical sensors (e.g., cameras, laser sensors, proximity sensors, location sensors (e.g., GPS modules)), and the like. In particular, the vehicle sensors 212 may determine the direction that the vehicle 102 is facing and the field of view of the augmented reality display 208.

In the example of FIG. 2, in which the augmented reality display 208 comprises a heads-up display, the field of view of the augmented reality display 208 is based on the size and location of the augmented reality display 208 (e.g., the windshield of the vehicle 102) and the direction that the vehicle 102 is facing. For example, the field of view of the augmented reality display 208 may comprise the area in front of the vehicle 102 that may be seen through the vehicle's windshield.

In examples where the augmented reality display 208 comprises an augmented reality headset worn by the driver of the vehicle 102, the field of view of the augmented reality display 208 may be based on the direction that the driver's head is facing (e.g., what can be seen through by the driver through the headset). In these examples, the augmented reality headset may comprise one or more sensors that determine the field of view of the augmented reality display 208.

Still referring to FIG. vehicle system 200 comprises network interface hardware 214 for communicatively coupling the vehicle system 200 to the edge server 104. The network interface hardware 214 can be communicatively coupled to the communication path 204 and can be any device capable of transmitting and/or receiving data via a network. Accordingly, the network interface hardware 214 can include a communication transceiver for sending and/or receiving any wired or wireless communication. For example, the network interface hardware 214 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 214 includes hardware configured to operate in accordance with the Bluetooth® wireless communication protocol. The network interface hardware 214 of the vehicle system 200 may transmit a request for traffic infrastructure visualization assistance to the edge server 104. The network interface hardware 214 of the vehicle system 200 may also transmit information such as the location of the vehicle 102, the direction that the vehicle 102 is facing, and the field of view of the augmented reality display 208 to the edge server 104.

In some embodiments, the vehicle system 200 may be communicatively coupled to the edge server 104 (See FIG. 1) by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
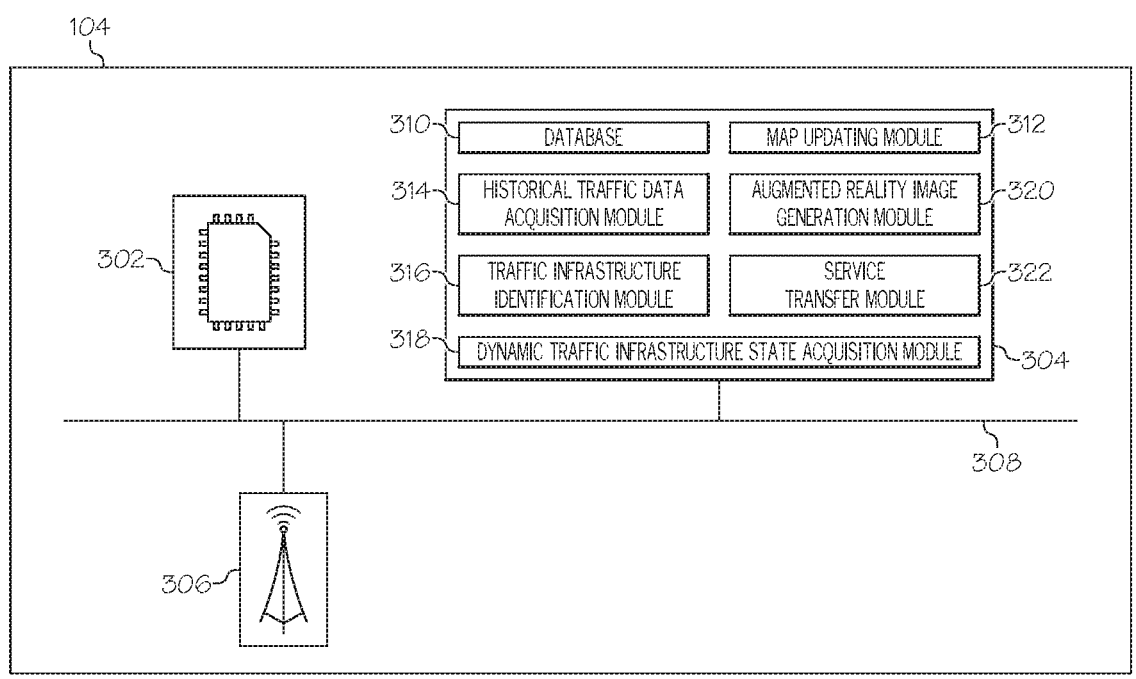
FIG. 3 depicts a schematic diagram of an edge server for providing traffic infrastructure visualization assistance, according to one or more embodiments shown and described herein.

Now referring to FIG. 3, the edge server 104 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302. The communication path 308 provides signal interconnectivity between various modules of the edge server 104.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the edge server 104 may transmit and receive data to and from the vehicle 102, the map server 106, and the historical traffic data server 108.

The one or more memory modules 304 include a database 310, a map updating module 312, an historical traffic data acquisition module 314, a traffic infrastructure identification module 316, a dynamic traffic infrastructure state acquisition module 318, an augmented reality image generation module 320, and a service transfer module 322. Each of the database 310, the map updating module 312, the historical traffic data acquisition module 314, the traffic infrastructure identification module 316, the dynamic traffic infrastructure state acquisition module 318, the augmented reality image generation module 320, and the service transfer module 322 may be a program module in the form of operating systems, application program modules, and other program modules stored in one or more memory modules 304. In some embodiments, the program module may be stored in a remote storage device that may communicate with the edge server 104. In some embodiments, one or more of the database 310, the map updating module 312, the historical traffic data acquisition module 314, the traffic infrastructure identification module 316, the dynamic traffic infrastructure state acquisition module 318, the augmented reality image generation module 320, and the service transfer module 322 may be stored in the one or more memory modules 206 of the vehicle system 200. Such a program module may include, but is not limited to, routines, subroutines, programs, objects, components, data structures and the like for performing specific tasks or executing specific data types as will be described below.

The database 310 may temporarily store data received from the vehicle 102, the map server 106, the historical traffic data server 108, and/or one or more dynamic traffic infrastructures. The data received from the vehicle 102 may include a position of the vehicle 102, the direction that the vehicle 102 is facing, and the field of view of the augmented reality display 208. The data received from the map server 106 may include a map of a geographic area covered by the edge server 104. The data received from the historical traffic data server 108 may include historical traffic data. The data received from dynamic traffic infrastructures may include a state of one or more dynamic traffic infrastructures. The map server 106 and the historical traffic data server 108 are discussed in further detail below in connection with FIGS. 4 and 5, respectively.

In some examples, the database 310 may permanently store certain data such as map data. Typically, the edge server 104 will provide coverage for a certain geographic area surrounding the edge server 104. The area of coverage of the edge server 104 may depend on the range of the network interface hardware 306. That is, the edge server 104 may provide coverage for a geographic area in which vehicles may communicate with the edge server 104. Multiple edge servers may be spaced such that each edge server covers a different geographic area. This may allow a vehicle travelling along the road 110 to always be covered by at least one edge server. As a vehicle moves between coverage areas of different edge servers, coverage may be transferred between the different edge servers utilizing the service transfer module 322, as explained below.

Because the edge server 104 typically provides coverage for a particular geographic area, the database 310 may permanently store a map of the geographic area covered by the edge server 104. The map stored in the database 310 of the edge server 104 may be updated by the map updating module 312, as explained below.

Referring still to FIG. 3, the map updating module 312 may update the map of the geographic area covered by the edge server 104 stored in the database 310. After the edge server 104 receives a request for traffic infrastructure visualization assistance from the vehicle 102, the map updating module 312 may determine whether the locally stored map in the database 310 is up to date. The map updating module 312 may determine whether the map stored in the database 310 is up to date by communicating with the map server 106, as explained in further detail below in connection with FIG. 4. If the map stored in the database 310 is not up to date, the map updating module 312 may request an updated map of the geographic area covered by the edge server 104 from the map server 106. After the edge server 104 receives an updated map from the map server 106, the updated map may be stored in the database 310 and the old version of the map may be deleted.

The map stored in the database 310 may include features typically found in street maps including locations of roads, intersections, on/off ramps, and the like. In addition, the map stored in the database 310 may include locations of traffic infrastructures such as lane lines, stop signs, traffic signs, and the like.

The historical traffic data acquisition module 314 may acquire historical traffic data from the historical traffic data server 108. Historical traffic data may comprise information about events affecting traffic, such as construction, road closures, traffic accidents, temporary traffic infrastructures, and the like. Historical traffic data is discussed in further detail below in connection with FIG. 5.

The traffic infrastructure identification module 316 may identify one or more traffic infrastructures within the field of view of the augmented reality display 208 of the vehicle system 200. Traffic infrastructures may comprise any marking, sign, or device that affects traffic flow, such as lane lines, traffic signs, traffic lights, and the like (e.g., the lane line 112 and the sign 114 as shown in FIG. 1). Certain traffic infrastructures may be dynamic traffic infrastructures, such as traffic lights or changeable signs, which may change between one or more states. Dynamic traffic infrastructures are discussed in further detail below in connection with the dynamic traffic infrastructure state acquisition module 318.

The traffic infrastructure identification module 316 may identify one or more traffic infrastructures within the field of view of the augmented reality display 208 of the vehicle system 200 based on the map of the geographic area covered by the edge server 104 stored in the database 310 and the field of view information received from the vehicle 102. As explained above, the map stored in the database 310 includes information about traffic infrastructures within the geographic area covered by the edge server 104. Thus, after the edge server 104 receives information from the vehicle 102 about the location of the vehicle 102 and the field of view of the augmented reality display 208, the traffic infrastructure identification module 316 may access the map stored in the database 310 and determine which traffic infrastructures identified on the map are located within the field of view of the augmented reality display 208.

The dynamic traffic infrastructure state acquisition module 318 may acquire state information from dynamic traffic infrastructures. As discussed above, dynamic traffic infrastructures are traffic infrastructures that change dynamically between two or more states. For example, traffic lights and signs that may change the text or images displayed on them are both dynamic traffic infrastructures. In order for the augmented reality display 208 to properly display dynamic traffic infrastructures, the dynamic traffic infrastructure state acquisition module 318 may transmit a request for a current state to a dynamic traffic infrastructure. Upon receiving such a request, a dynamic traffic infrastructure may transmit its current state to the dynamic traffic infrastructure state acquisition module 318. The edge server 104 may then use the state information when creating an augmented reality image, as discussed in further detail below.

The augmented reality image generation module 320 may generate an augmented reality image to be displayed by the augmented reality display 208 of the vehicle system 200. The augmented reality image generated by the augmented reality image generation module 320 may highlight the traffic infrastructures identified by the traffic infrastructure identification module 316. These traffic infrastructures may be highlighted at the location that they would appear to the driver of the vehicle 102 based on the field of view of the augmented reality display 208. For example, the augmented reality image shown in FIG. 8B highlights lane lines 802, 804 at the locations on the road that the lane lines should be located. Thus, as a driver is driving the vehicle 102 and using the augmented reality assisted traffic infrastructure visualization of this disclosure, the driver is able to see the locations of identified traffic infrastructures in their natural locations and the driver may navigate the vehicle 102 accordingly.

Referring back to FIG. 3, the service transfer module 322 detects when the vehicle 102 is nearing the edge of the coverage area of the edge server 104 and thus, is likely about to leave the coverage area of the edge server 104. When the service transfer module 322 detects that the vehicle 102 is about to leave the coverage area of the edge server 104, the service transfer module 322 determines whether the vehicle 102 will be entering a coverage area of another edge server (e.g., based on the location of the vehicle 102 and the direction of travel of the vehicle 102). If the vehicle 102 will be entering a coverage area of another edge server, the service transfer module 322 may transfer the service request from the vehicle 102 to the edge server whose coverage area the vehicle 102 is entering. As such, the new edge server may begin to provide augmented reality assisted traffic infrastructure visualization to the vehicle 102 such that the vehicle 102 receives uninterrupted service.

If the vehicle 102 is not entering an area covered by another edge server, then the edge server 104 terminates service to the vehicle 102 once the vehicle 102 leaves the coverage area of the edge server 104. In some examples, prior to terminating service to the vehicle 102, the service transfer module 322 may transmit a message to the vehicle 102 to indicate that service is being terminated. In these examples, upon receiving such a message, the augmented reality display 208 may display a message to the driver of the vehicle 102 indicating that service is about to be terminated.

Figure 4:
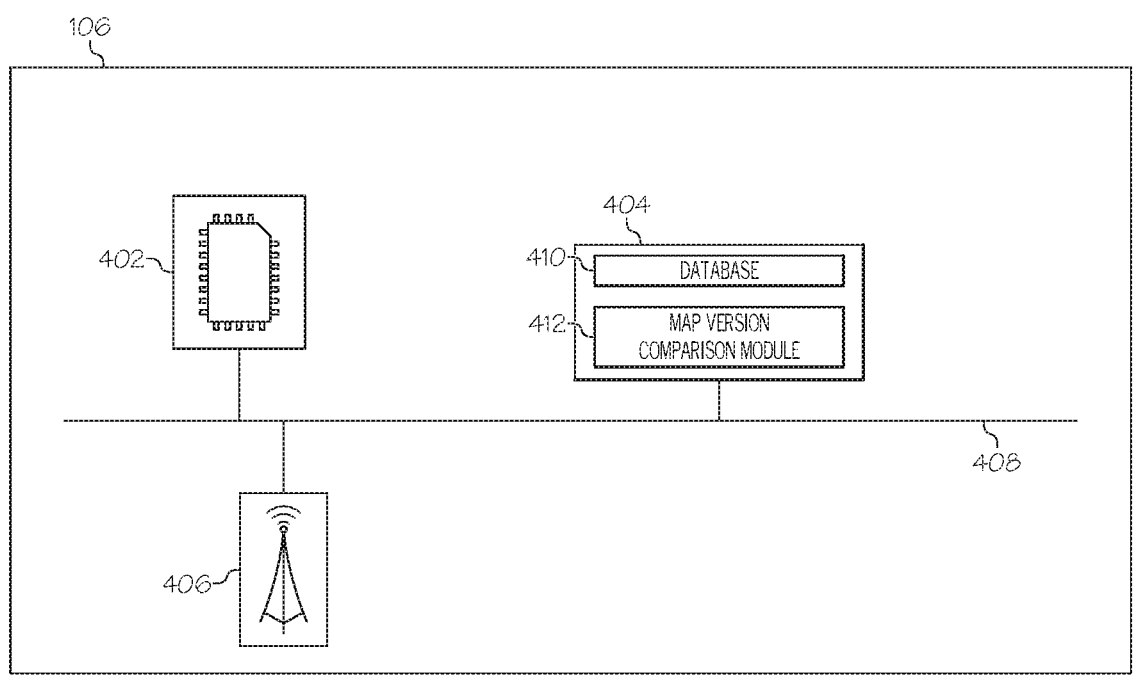
FIG. 4 depicts a schematic diagram of a map server, according to one or more embodiments shown and described herein.

Referring now to FIG. 4, the map server 106 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402. The communication path 408 provides signal interconnectivity between various modules of the map server 106.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. The network interface hardware 406 of the map server 106 may transmit and receive data to and from the edge server 104.

The one or more memory modules 404 include a database 410 and a map version comparison module 412. Each of the database 410 and the map version comparison module 412 may be a program module in the form of operating systems, application program modules, and other program modules stored in one or more memory modules 404. In some embodiments, the program module may be stored in a remote storage device that may communicate with the edge server 104. In some embodiments, one or more of the database 410 and the map version comparison module 412 may be stored in the one or more memory modules 304 of the edge server 104. Such a program module may include, but is not limited to, routines, subroutines, programs, objects, components, data structures and the like for performing specific tasks or executing specific data types as will be described below.

Still referring to FIG. 4, the database 410 may store maps of one or more geographic areas covered by one or more edge servers (e.g., the edge server 104). As explained above, in connection with FIG. 3, the one or maps stored in the database 410 of the map server 106 may comprise locations of traffic infrastructures, in addition to traditional map features. The one or more maps stored in the database 410 may also indicate which traffic infrastructures are dynamic traffic infrastructures. The one or more maps stored in the database 410 of the map server 106 may be periodically updated so as to be as up to date as possible (e.g., when traffic infrastructures within the geographic area covered by a map are changed).

The map version comparison module 412 may determine whether the map stored in the database 310 of the edge server 104 is up to date. In some examples, the map stored in the database 310 of the edge server 104 and the map of the geographic area covered by the edge server 104 stored in the database 410 of the map server 106 each have a version number. In these examples, whenever the map stored in the database 410 of the map server 106 is updated, it is given a new version number. Accordingly, the map version comparison module 412 may compare the version number of the map stored in the database 310 of the edge server 104 to the version number of the map stored in the database 410 of the map server 106 to determine whether the map stored in the edge server 104 is up to date. In other examples, the map version comparison module 412 may directly compare the features of the map stored in the edge server 104 to the features of the map stored in the map server 106 to determine whether the map stored in the edge server 104 is up to date. If the map stored in the edge server 104 is not up to date, the map server 106 may transmit an up to date map to the edge server 104.

Figure 5:
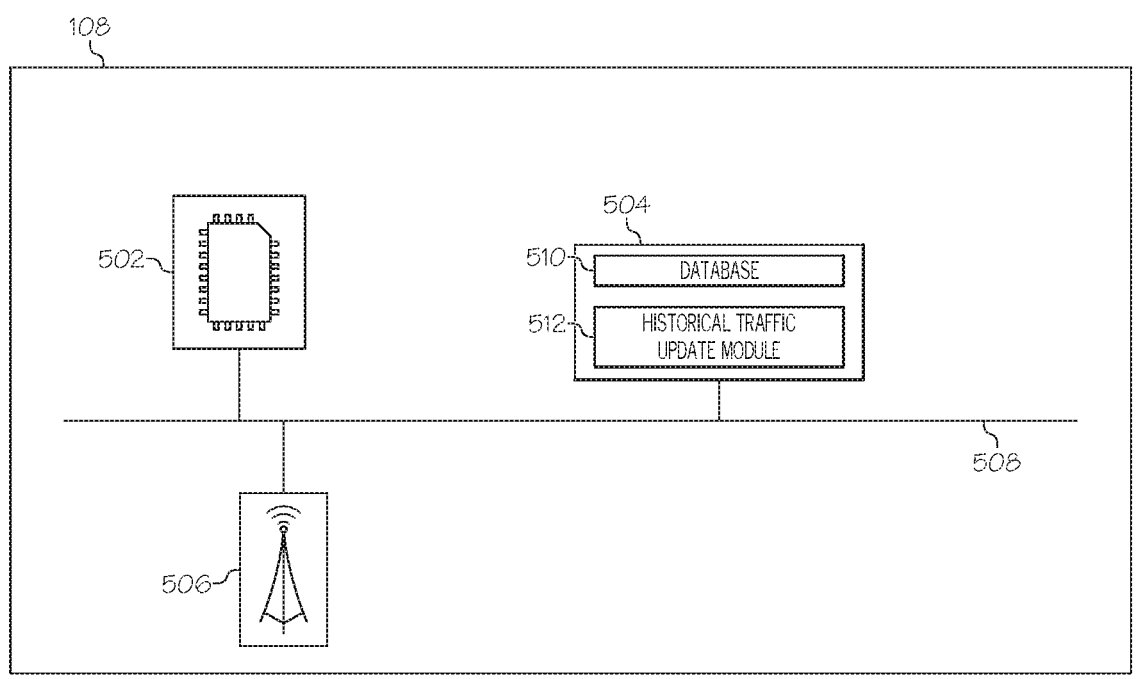
FIG. 5 depicts a schematic diagram of a historical traffic data server, according to one or more embodiments shown and described herein.

Referring now to FIG. 5, the historical traffic data server 108 comprises one or more processors 502, one or more memory modules 504, network interface hardware 506, and a communication path 508. The one or more processors 502 may be a controller, an integrated circuit, a microchip, a computer, or any other computing device. The one or more memory modules 504 may comprise RAM, ROM, flash memories, hard drives, or any device capable of storing machine readable and executable instructions such that the machine readable and executable instructions can be accessed by the one or more processors 502. The communication path 508 provides signal interconnectivity between various modules of the historical traffic data server 108.

The network interface hardware 506 can be communicatively coupled to the communication path 508 and can be any device capable of transmitting and/or receiving data via a network. Accordingly, the network interface hardware 506 can include a communication transceiver for sending and/or receiving any wired or wireless communication. For example, the network interface hardware 506 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 506 includes hardware configured to operate in accordance with the Bluetooth® wireless communication protocol. The network interface hardware 506 of the historical traffic data server 108 may transmit and receive data to and from the edge server 104.

The one or more memory modules 504 include a database 510 and a historical traffic update module 512. Each of the database 510 and the historical traffic update module 512 may be a program module in the form of operating systems, application program modules, and other program modules stored in one or more memory modules 504. In some embodiments, the program module may be stored in a remote storage device that may communicate with the edge server 104. Such a program module may include, but is not limited to, routines, subroutines, programs, objects, components, data structures and the like for performing specific tasks or executing specific data types as will be described below.

Figure 10A:
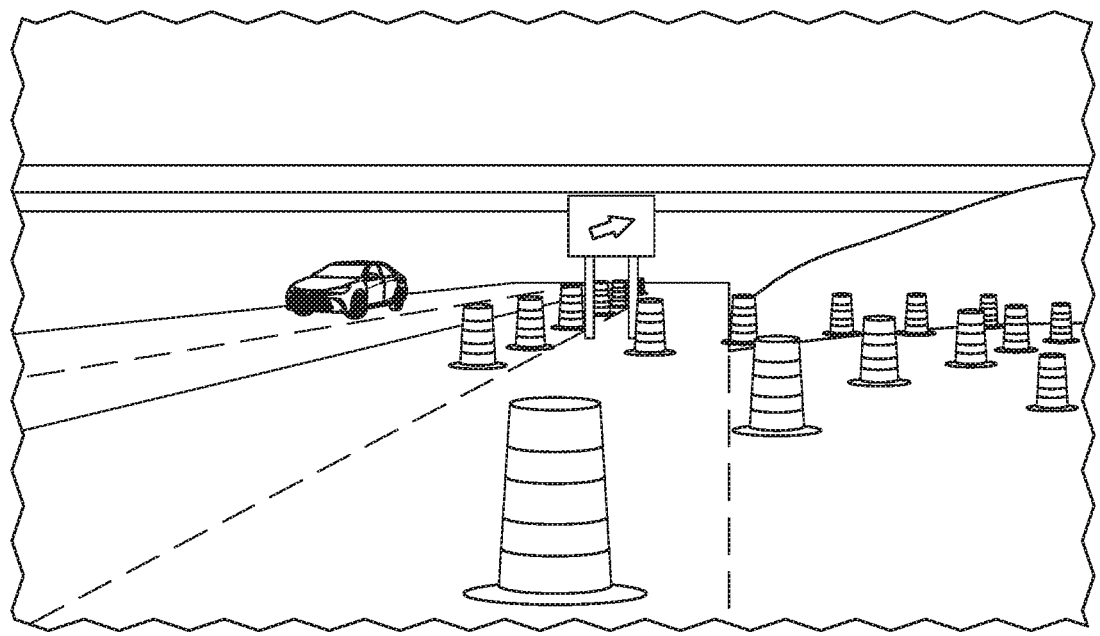
FIG. 10A depicts an image of a road comprising a construction site.
Figure 10B:
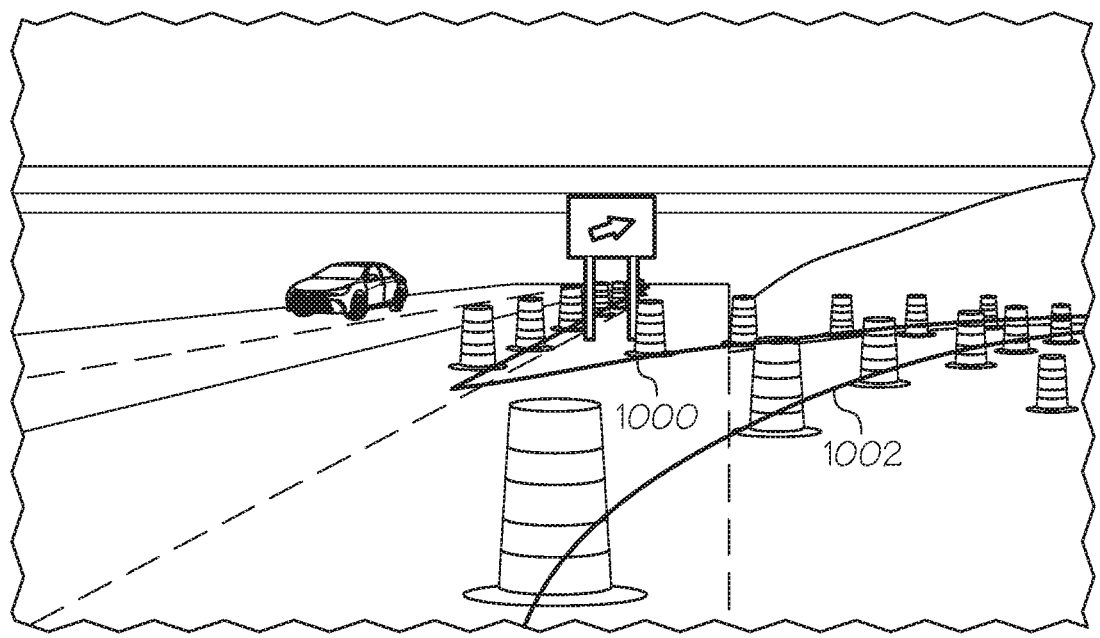
FIG. 10B depicts an image of the road of FIG. 10A with an augmented reality image highlighting a virtual lane created by traffic cones.

Still referring to FIG. 5, the database 510 may store historical traffic data for one or more geographic areas covered by one or more edge servers (e.g., edge server 104). As discussed above, the historical traffic data stored in the database 510 of the historical traffic data server 108 may comprise information about events affecting traffic at one or more locations in a geographic area covered by an edge server. In one example, historical traffic data may include information about constructions. Such information may include a construction plan, road closures, or artificial lanes (e.g., a lane created by temporary traffic cones, as shown in FIGS. 10A, 10B), and the like.

In another example, historical traffic data may include information about traffic accidents. This may include a location of a traffic accident, along with traffic affecting information related to the accident, such as lane closures or the locations of flares or other temporary barriers. This type of historical traffic data may allow the augmented reality display 208 to display images or other information about an upcoming traffic accident before a driver would otherwise be aware of the accident. This may help the driver better navigate through or around an accident site.

In another example, historical traffic data may include temporary lane or road closures, for example, due to a festival, road race, or other public event utilizing roads within a coverage area of an edge server. This may allow the augmented reality display 208 to display images or other information indicating an upcoming lane or road closure such that a driver may more easily merge onto a different lane or take an alternate route as appropriate.

Referring back to FIG. 5, the historical traffic update module 512 may receive information regarding historical traffic data and update the historical traffic data stored in the database 510. For example, the historical traffic update module 512 may receive traffic accident reports from police. The historical traffic update module 512 may receive construction plans or road closure information from municipal offices. The historical traffic update module 512 may also receive information indicating that a historical traffic event is no longer affecting traffic (e.g., that an accident site has been cleared and there are no longer any lane closures). All such information received by the historical traffic update module 512 may be stored in the database 510 and may be used to update the historical traffic data stored in the database 510.

In some embodiments, the historical traffic data server 108 may be an edge server including one or more sensors such as cameras. The one or more sensors may collect historical traffic data and store them in the database 510 locally. For example, one or more cameras of the edge server may capture images of the road, vehicles on the road, traffic lights, traffic signs, and the like. The historical traffic data server 108 may process the images to obtain historical traffic data and store the historical traffic data in the database 510. In some embodiments, the historical traffic data server 108 may be a remote server communicatively coupled to the edge server 104.

Figure 6:
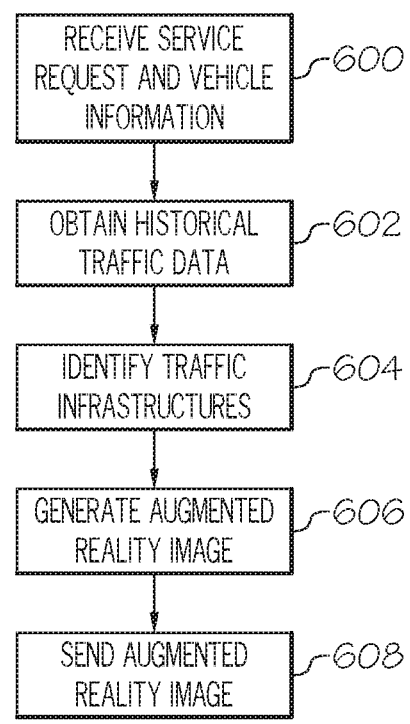
FIG. 6 depicts a flowchart for providing traffic infrastructure visualization assistance, according to one or more embodiments shown and described herein.

FIG. 6 depicts a flowchart for providing traffic infrastructure visualization assistance, according to one or more embodiments shown and described herein. At step 600, the edge server 104 receives a service request for traffic infrastructure visualization assistance from the vehicle 102 while the vehicle 102 is within the geographic area covered by the edge server 104. The edge server 104 also receives information about the vehicle 102 including the location of the vehicle 102, the direction vehicle 102 is facing, and the field of view of the augmented reality display 208.

At step 602, the historical traffic data acquisition module 314 obtains historical traffic data from the historical traffic data server 108. In some examples, the historical traffic data acquisition module 314 obtains historical traffic data for an area around the location of the vehicle 102 (e.g., an area within a predetermined distance ahead of the vehicle 102 in the direction that the vehicle 102 is travelling). In other examples, the historical traffic data acquisition module 314 obtains historical traffic data for the entire geographic area covered by the edge server 104.

At step 604, the traffic infrastructure identification module 316 identifies one or more traffic infrastructures that are within the field of view of the augmented reality display 208. The one or more traffic infrastructures may be identified by the traffic infrastructure identification module 316 based on the location of the vehicle 102, the direction the vehicle 102 is facing, the field of view of the augmented reality display 208, the historical traffic data obtained by the historical traffic data acquisition module 314, and the map of the geographic area. For example, the traffic infrastructure identification module 316 may access the map of the geographic area and determine which traffic infrastructures identified on the map are located ahead of the vehicle 102 based on the location of the vehicle 102 and its direction of travel. The traffic infrastructure identification module 316 may also identify traffic infrastructures obtained by the historical traffic data acquisition module 314 (e.g., temporary traffic infrastructures caused by road closures).

At step 606, the augmented reality image generation module 320 generates an augmented reality image showing the traffic infrastructures identified by the traffic infrastructure identification module 316. As discussed above, the augmented reality image generation module 320 generates the augmented reality image showing the identified traffic infrastructures at the location or locations where they would be normally seen through the field of view of the augmented reality display 208. That is, the augmented reality image may be overlaid on top of the natural scene viewed by the driver of the vehicle 102 through the augmented reality display 208. Examples of augmented reality images are discussed below in connection with FIGS. 8-11.

At step 608, the edge server 104 transmits the generated augmented reality image to the vehicle 102. After the augmented reality image is received by the vehicle 102, the image may be displayed by the augmented reality display 208. While the vehicle 102 remains within and moves through the geographic area covered by the edge server 104, the steps of FIG. 6 may be repeated such that the vehicle 102 continually receives an updated augmented reality image to be displayed by the augmented reality display 208 as the location of the vehicle 102 and the field of view of the augmented reality display 208 changes.

Figure 7:
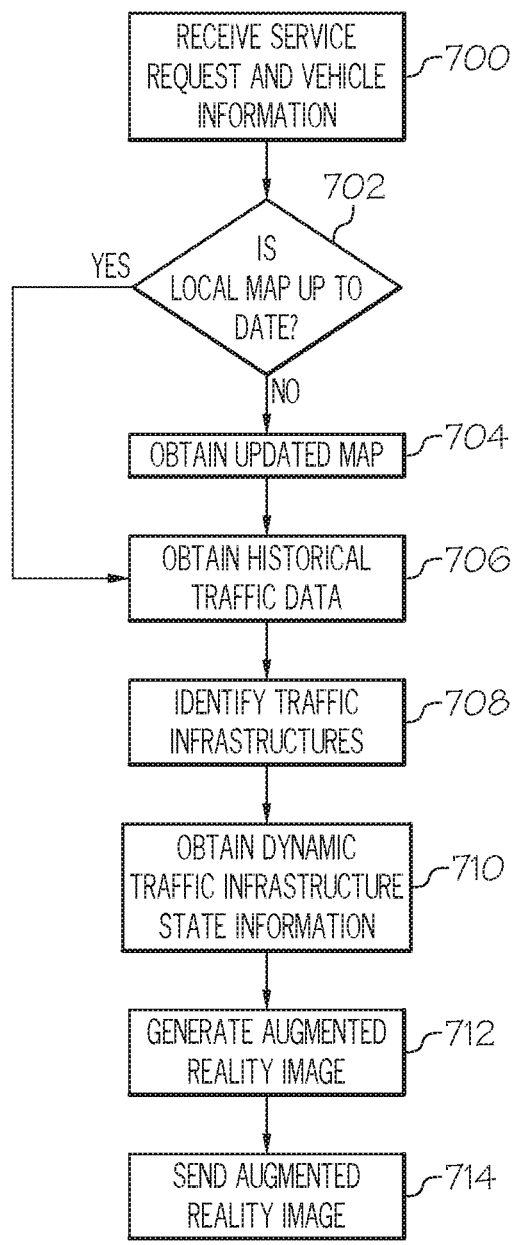
FIG. 7 depicts another flowchart for providing traffic infrastructure visualization assistance, according to one or more embodiments shown and described herein.

FIG. 7 depicts another flowchart for providing traffic infrastructure visualization assistance, according to one or more embodiments shown and described herein. At step 700, the edge server 104 receives a service request for traffic infrastructure visualization assistance from the vehicle 102 while the vehicle 102 is within the geographic area covered by the edge server 104. The edge server 104 also receives information about the vehicle 102 including the location of the vehicle 102, the direction that the vehicle 102 is facing, and the field of view of the augmented reality display 208.

At step 702, the map updating module 312 determines whether the map stored in the database 310 of the edge server 104 is up to date. If the map updating module 312 determines that the locally stored map is up to date (YES at step 702), then control passes to step 706. If the map updating module 312 determines that the locally stored map is not up to date (NO at step 702), then at step 704, the map updating module 312 requests an updated map from the map server 106. After the edge server 104 receives the updated map from the map server 106, the updated map may be stored in the database 310.

At step 706, the historical traffic data acquisition module 314 obtains historical traffic data from the historical traffic data server 108. In some examples, the historical traffic data acquisition module 314 obtains historical traffic data for an area around the location of the vehicle 102 (e.g., an area within a predetermined distance ahead of the vehicle 102 in the direction that the vehicle 102 is travelling). In other examples, the historical traffic data acquisition module 314 obtains historical traffic data for the entire geographic area covered by the edge server 104.

At step 708, the traffic infrastructure identification module 316 identifies one or more traffic infrastructures that are within the field of view of the augmented reality display 208. The one or more traffic infrastructures may be identified by the traffic infrastructure identification module 316 based on the location of the vehicle 102, the direction the vehicle 102 is facing, the field of view of the augmented reality display 208, the historical traffic data obtained by the historical traffic data acquisition module 314, and the map of the geographic area. The traffic infrastructure identification module 316 may also identify traffic infrastructures obtained by the historical traffic data acquisition module 314.

At step 710, if any of the traffic infrastructures identified by the traffic infrastructure identification module 316 are dynamic traffic infrastructures, the dynamic traffic infrastructure state acquisition module 318 sends a request to the identified dynamic traffic infrastructures requesting their current state (e.g., which color of a traffic light is illuminated). If none of the identified traffic infrastructures are dynamic traffic infrastructures, then step 710 may be eliminated.

At step 712, the augmented reality image generation module 320 generates an augmented reality image showing the traffic infrastructures identified by the traffic infrastructure identification module 316. If any of the identified traffic infrastructures are traffic infrastructures, the generated augmented reality image may indicate the current state of the traffic infrastructures. Then, at step 714, the edge server 104 transmits the generated augmented reality image to the vehicle 102. While the vehicle 102 remains within and moves through the geographic area covered by the edge server 104, the steps of FIG. 7 may be repeated such that the vehicle 102 continually receives an updated augmented reality image to be displayed by the augmented reality display 208 as the location of the vehicle 102 and the field of view of the augmented reality display 208 changes.

As discussed above, the augmented reality image generation module 320 generates the augmented reality image showing the identified traffic infrastructures at the location or locations where they would be normally seen through the field of view of the augmented reality display 208. That is, the augmented reality image may be overlaid on top of the natural scene viewed by the driver of the vehicle 102 through the augmented reality display 208. Examples of augmented reality images are discussed below in connection with FIGS. 8A-11B.

Figure 8A:
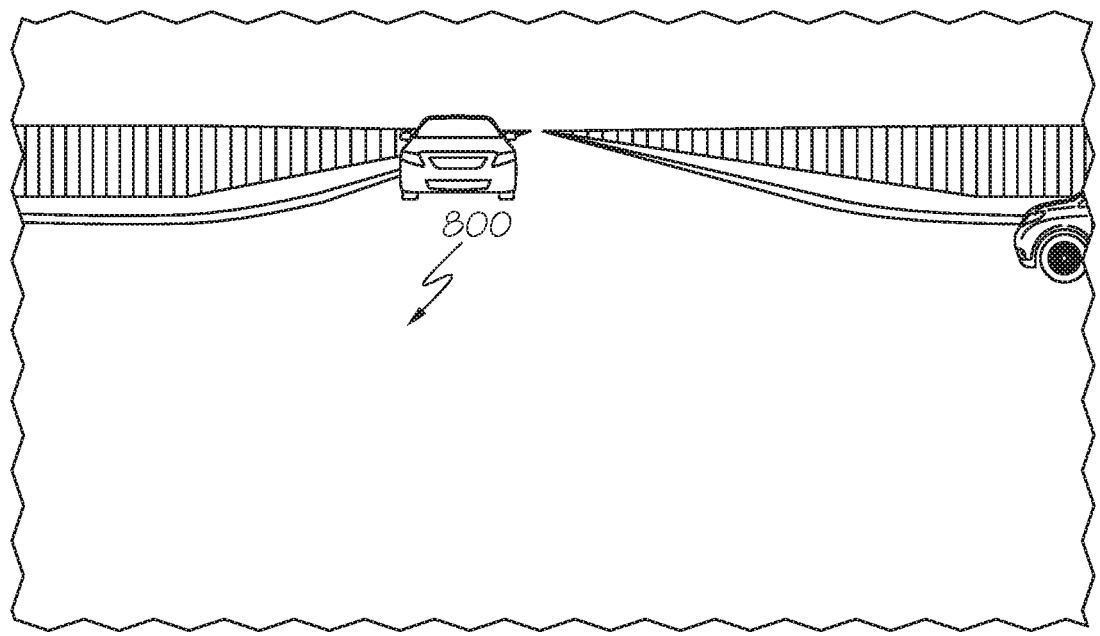
FIG. 8A depicts an image of a road with faded lane lines.

Referring now to FIG. 8A, an image of an intersection 800 is shown. The image in FIG. 8A may be the scene that a driver sees through the windshield of the vehicle 102 as the vehicle 102 approaches the intersection 800 without the use of traffic infrastructure visualization assistance. In FIG. 8A, the intersection 800 at one point had lane lines guiding an approaching vehicle to make a left turn. However, the lane lines have faded over time and are no longer visible, making it difficult for a driver to navigate through the intersection 800.

Figure 8B:
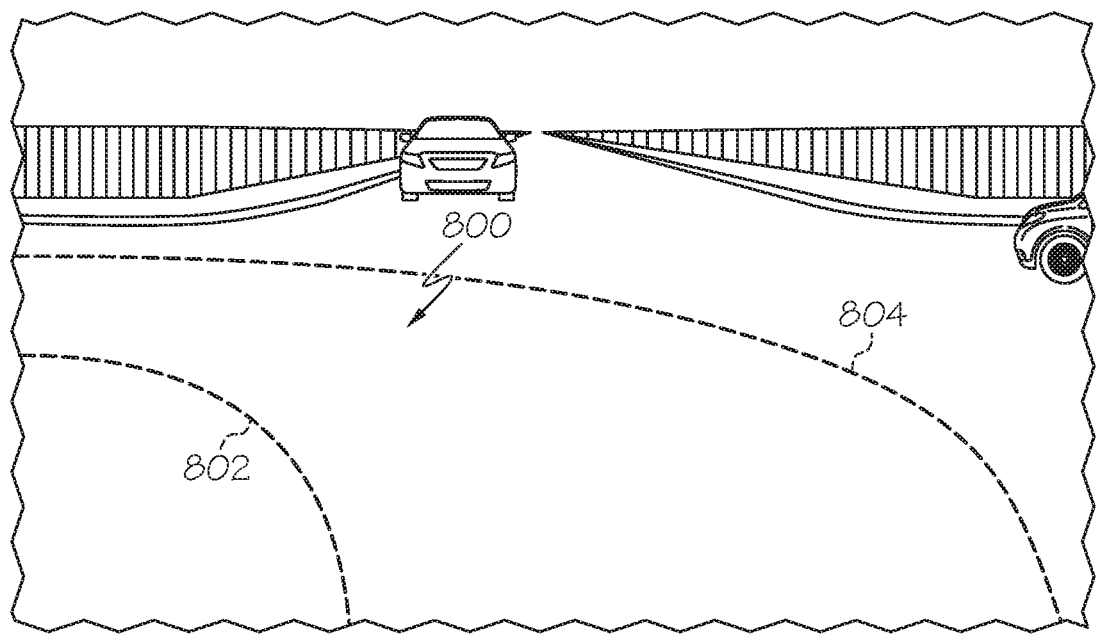
FIG. 8B depicts an image of the road of FIG. 8A with an augmented reality image showing lane lines.
Figure 9A:
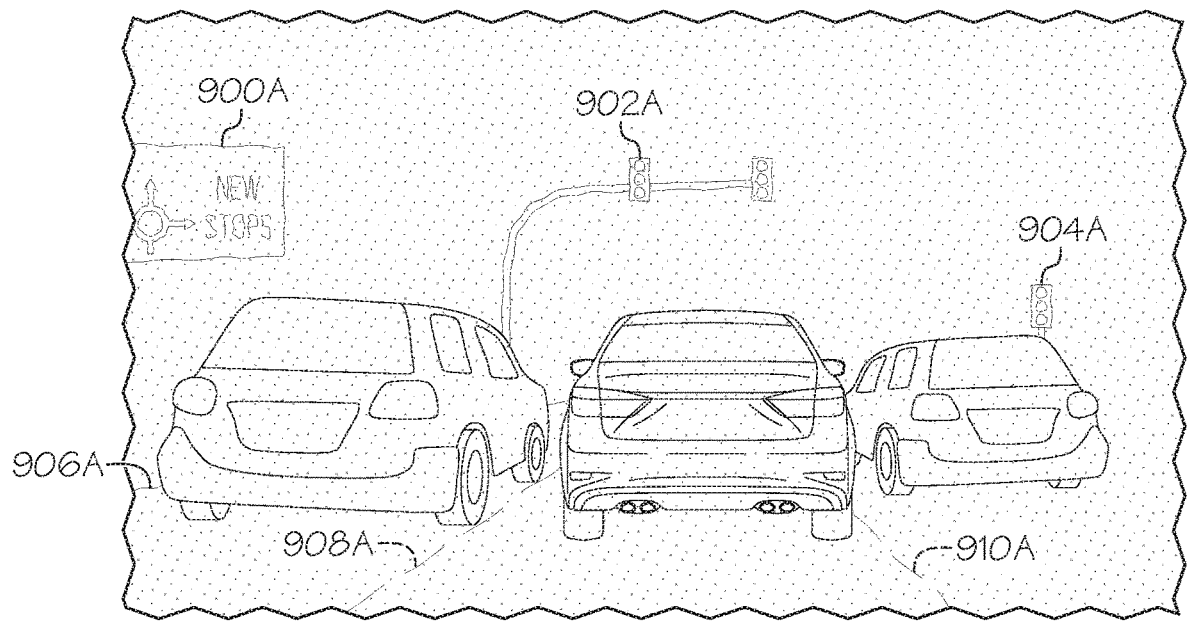
FIG. 9A depicts an image of a road with various traffic infrastructures obscured by fog.
Figure 9B:
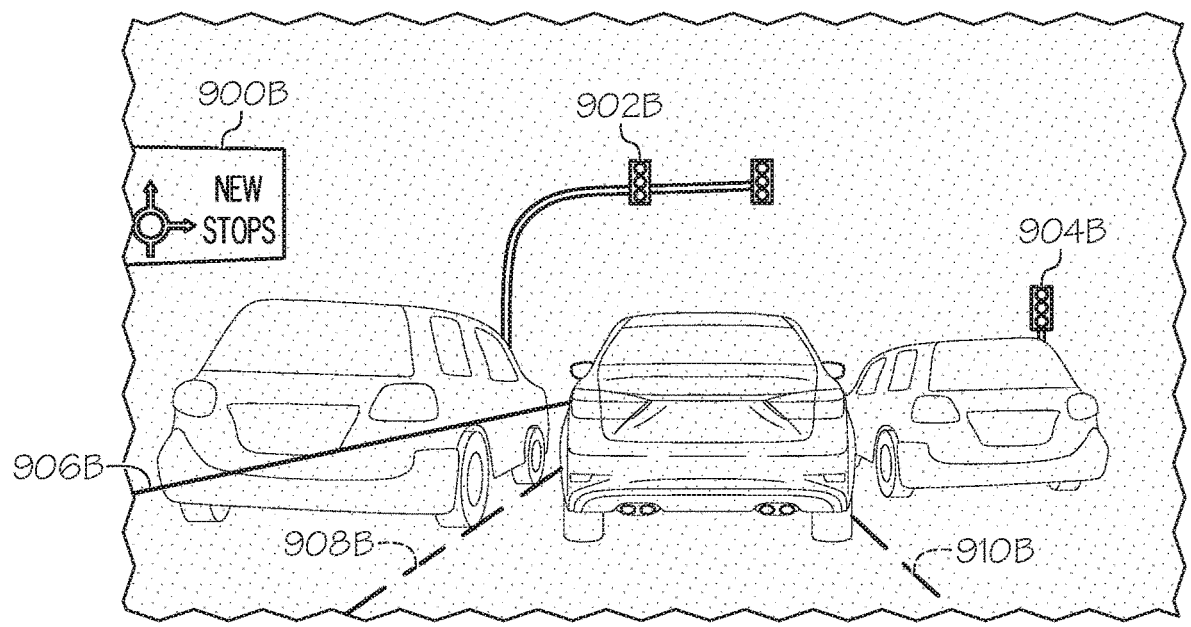
FIG. 9B depicts an image of the road of FIG. 9A with an augmented reality image highlighting various traffic infrastructures.

FIG. 8B shows an image of the intersection 800 along with an augmented reality image showing lane lines 802, 804. In FIG. 8B, the augmented reality image shows the lane lines 802, 804 at the locations that the actual lane lines would appear to the driver of the vehicle 102 if the lane lines were not faded. Thus, the driver may use the lane lines 802, 804 shown in the augmented reality image to navigate through the intersection 800.

Referring now to FIG. 9A, an image of a road is shown as may be seen by a driver of the vehicle 102 through the windshield without the use of traffic infrastructure visualization assistance. The image of FIG. 9A shows traffic infrastructures including a traffic sign 900A, traffic lights 902A, 904A, and lane lines 906A, 908A, 910A. However, as can be seen in FIG. 9A, there is a heavy fog which reduces visibility and makes it difficult to view the various traffic infrastructures.

FIG. 9B shows the same image of the road from FIG. 9A along with an augmented reality image generated according to the teachings of this disclosure. The augmented reality image of FIG. 9B shows a highlighted traffic sign 900B, traffic lights 902B, 904B, and lane lines 906B, 908B, 910B. The highlighted traffic infrastructures 900B, 902B, 9049, 9069, 908B, 910B of the augmented reality image of FIG. 9B are superimposed over the locations of the corresponding actual traffic infrastructures 900A, 902A, 904A, 906A, 908A, 910A. As such, the driver of the vehicle 102 is able to see the traffic infrastructures just as well as they would be able to in the absence of the fog creating the reduced visibility.

Referring now to FIG. 10A, an image of an exit ramp is shown as may be seen by a driver of the vehicle 102 through the windshield without the use of traffic infrastructure visualization assistance. As can be seen in FIG. 10A, a plurality of traffic cones have been set up to close a portion of the exit ramp (e.g., due to a construction project), thereby creating an artificial lane that drivers must navigate to use the ramp. This artificial lane is defined by the locations of the traffic cones. However, if any of the traffic cones are moved, destroyed, or obstructed from view, the exact location of the artificial lane may become partially ill defined. Accordingly, workers who set up the traffic cones may upload their location to the historical traffic data server 108 such that drivers may access this data when using traffic infrastructure visualization assistance according to this disclosure.

FIG. 10B shows the image of the exit ramp of FIG. 10A along with an augmented reality image showing lane lines 1000, 1002 comprising the virtual lane defined by the traffic cones. Thus, the driver of the vehicle 102 may use the lane lines 1000, 1002 of the augmented reality image to safely navigate the virtual lane defined by the traffic cones.

Figure 11A:
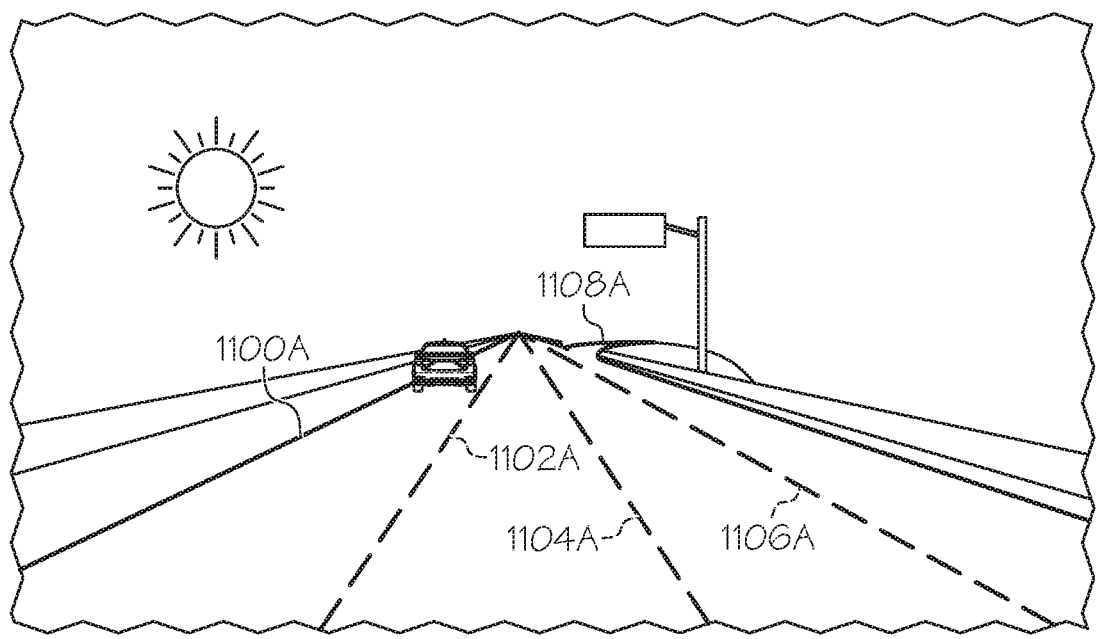
FIG. 11A depicts an image of a road during daylight hours.

Referring now to FIG. 11A, a road is shown having lane lines 1100A, 1102A 1104A, 1106A, 1108A. FIG. 11A shows the road as it may be seen during the daytime when the lane lines 1100A, 1102A, 1104A, 1106A, 1108A are easily visible.

Figure 11B:
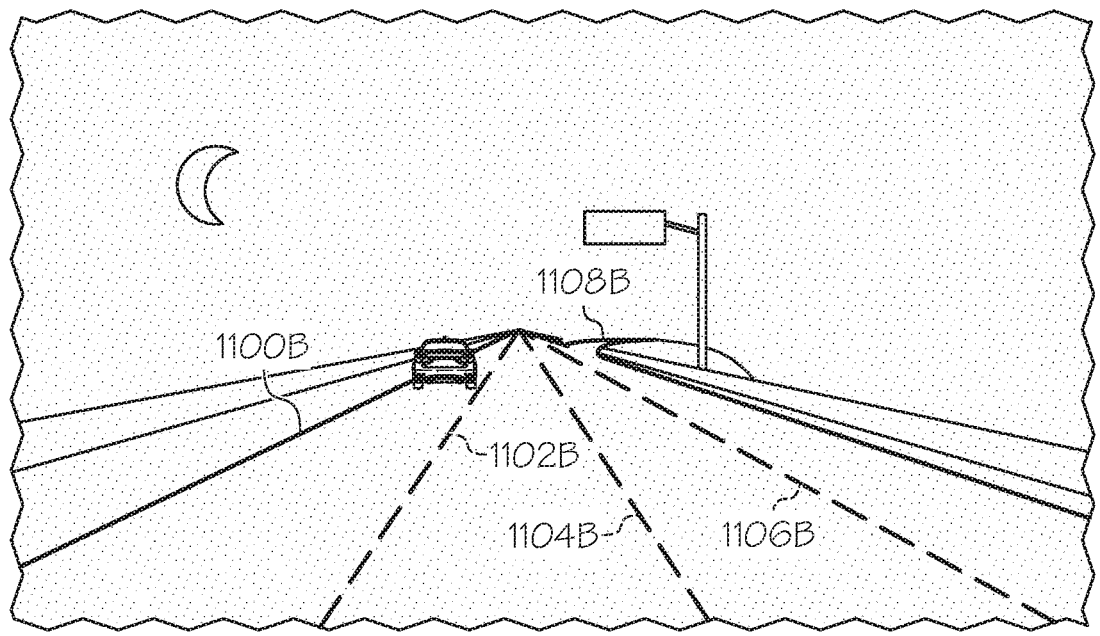
FIG. 11B depicts an image of the road of FIG. 11A during nighttime hours with an augmented reality image highlight lane lines.

FIG. 11B shows the road of FIG. 11A as may be viewed at night when the lane lines of the road are not easily visible. The lane lines may be visible when illuminated by vehicle headlights. However, headlights typically have a limited range and may not allow lane lines to be seen past a certain distance. FIG. 11B shows a superimposed augmented reality image showing lane lines 1100B, 1102B, 1104B, 1106B, 1108B. The augmented reality image may allow a driver of the vehicle 102 to see the lane lines of the road at a greater distance than when only using headlights and may allow the driver to safely navigate at night.

It should be understood that embodiments described herein are directed to systems and methods for providing traffic infrastructure visualization assistance. A vehicle may submit a request for traffic infrastructure visualization assistance to an edge server that provides coverage for an appropriate geographic area. The edge server may receive the request and may also receive information from the vehicle including the vehicle's location, the direction the vehicle is facing, and a field of view for an augmented reality display, which may be a heads-up display. The edge server may obtain an updated map of the geographic area and historical traffic data. The edge server may use the map and the historical traffic data to identify one or more traffic infrastructures within the field of view of the augmented reality display. The edge server may then generate an augmented reality image highlighting the identified traffic infrastructures and may transmit the augmented reality image to the vehicle. After the vehicle receives the augmented reality image, the augmented reality display may display the received augmented reality image.

It is noted drat the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
  receiving a service request from a vehicle within a geographic area;
  receiving a first set of data from the vehicle comprising a position of the vehicle within the geographic area, a direction that the vehicle is facing, and a field of view for an augmented reality display associated with the vehicle;

obtaining historical traffic data associated with the geographic area, the historical traffic data comprising data about construction, road closures, or traffic accidents;

identifying one or more traffic infrastructures within the field of view of the augmented reality display based on a map associated with the geographic area, the historical traffic data, the position of the vehicle, and the direction the vehicle is facing;

generating an augmented reality image for the one or more traffic infrastructures based on the historical traffic data, state information associated with the one or more traffic infrastructures, and the field of view of the augmented reality display; and sending the augmented reality image to the vehicle.

2. The method of claim 1, further comprising:
determining whether a locally stored map of the geographic area is up to date; and
in response to determining that the locally stored map of the geographic area is not up to date, requesting an updated map of the geographic area.

3. The method of claim 1, wherein the augmented reality display comprises a heads up display for the vehicle.

4. The method of claim 1, wherein the augmented reality display comprises an augmented reality headset.

5. The method of claim 1, wherein the one or more traffic infrastructures comprise one or more lane lines.

6. The method of claim 1, wherein the one or more traffic infrastructures comprise one or more traffic signs.

7. The method of claim 1, wherein the historical traffic data comprises a construction plan.

8. The method of claim 1, wherein the historical traffic data comprises one or more road closures.

9. The method of claim 1, wherein the historical traffic data comprises traffic accident information.

10. The method of claim 1, wherein the one or more traffic infrastructures comprise one or more temporary traffic infrastructures.

11. The method of claim 1, wherein the one or more traffic infrastructures comprise one or more dynamically changeable signs.

12. The method of claim 1, further comprising:
determining that the vehicle is leaving a first service coverage area;
determining whether the vehicle is entering a second service coverage area; and
in response to determining that the vehicle is entering the second service coverage area, transferring the service request to a computing device associated with the second service coverage area.

13. An edge server comprising:
a controller programmed to:
receive a service request from a vehicle within a geographic area serviced by the edge server;
receive a first set of data from the vehicle comprising a position of the vehicle within the geographic area, a direction that the vehicle is facing, and a field of view for an augmented reality display associated with the vehicle;
obtain historical traffic data associated with the geographic area, the historical traffic data comprising data about construction, road closures, or traffic accidents;
identify one or more traffic infrastructures within the field of view of the augmented reality display based on a map associated with the geographic area, the historical traffic data, the position of the vehicle, and the direction the vehicle is facing;
generate an augmented reality image for the one or more traffic infrastructures based on the historical traffic data, state information associated with the one or more traffic infrastructures, and the field of view of the augmented reality display; and
send the augmented reality image to the vehicle.

14. The edge server of claim 13, wherein the controller is programmed to:
determine whether a map of the geographic area stored on the edge server is up to date; and
in response to determining that the map of the geographic area stored on e edge server is not up to date, request an up to date map of the geographic area.

15. The edge server of claim 13, wherein the controller is programmed to:
determine when the vehicle is leaving the geographic area serviced by the edge server;
determine whether the vehicle is entering a second geographic area serviced by a second edge server; and
in response to determining that the vehicle is entering the second geographic area, transferring the service request to the second edge server.

16. A system comprising:
an edge server;
a map server; and
a historical traffic data server,
wherein the edge server is configured to:
receive a service request from a vehicle within a geographic area serviced by the edge server;
determine whether a map of the geographic area stored on the edge server is up to date;
in response to determining that the map of the geographic area stored on the edge server is not up to date, request an up to date map of the geographic area from the map server;
receive a first set of data from the vehicle comprising a position of the vehicle within the geographic area, a direction that the vehicle is facing, and a field of view for an augmented reality display associated with the vehicle;
receive historical traffic data associated with the geographic area from the historical traffic data server, the historical traffic data comprising data about construction, road closures, or traffic accidents;
identify one or more traffic infrastructures within the field of view of the augmented reality display based on the map, the historical traffic data, the position of the vehicle, and the direction the vehicle is facing;
generate an augmented reality image for the one or more traffic infrastructures based on the historical traffic data, state information associated with the one or more traffic infrastructures, and the field of view of the augmented reality display; and
send the augmented reality image to the vehicle.

17. The system of claim 16, wherein the edge server is configured to:
determine when the vehicle is leaving the geographic area serviced by the edge server;
determine whether the vehicle is entering a second geographic area serviced by a second edge server; and
in response to determining that the vehicle is entering the second geographic area, transferring the service request to the second edge server.

* * * * *

UNITED STATES PATENT AND TRADEMARK OFFICE
CERTIFICATE OF CORRECTION

| | |
|---|---|
| PATENT NO. | : 11,623,653 B2 |
| APPLICATION NO. | : 16/750210 |
| DATED | : April 11, 2023 |
| INVENTOR(S) | : Yin-Chen Liu and BaekGyu Kim |

It is certified that error appears in the above-identified patent and that said Letters Patent is hereby corrected as shown below:

In the Specification

In Column 15, Line(s) 43 & 44, delete "9049, 9069," and insert --904B, 906B,--, therefor.

Signed and Sealed this
Thirtieth Day of May, 2023

Katherine Kelly Vidal
*Director of the United States Patent and Trademark Office*